United States Patent
Bernhardt et al.

(10) Patent No.: US 10,074,272 B2
(45) Date of Patent: Sep. 11, 2018

(54) METHOD, APPARATUS AND COMPUTER PROGRAM PRODUCT FOR TRAFFIC LANE AND SIGNAL CONTROL IDENTIFICATION AND TRAFFIC FLOW MANAGEMENT

(71) Applicant: HERE Global B.V., Eindhoven (NL)

(72) Inventors: Bruce Bernhardt, Chicago, IL (US); Jingwei Xu, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 22 days.

(21) Appl. No.: 14/980,410

(22) Filed: Dec. 28, 2015

(65) Prior Publication Data

US 2017/0186314 A1    Jun. 29, 2017

(51) Int. Cl.
*G08G 1/01* (2006.01)
*H04L 29/08* (2006.01)
*G08G 1/08* (2006.01)

(52) U.S. Cl.
CPC ......... *G08G 1/0145* (2013.01); *G08G 1/0112* (2013.01); *G08G 1/0116* (2013.01);
(Continued)

(58) Field of Classification Search
CPC .. G08G 1/0141; G08G 1/0112; G08G 1/0133; G08G 1/00; G08G 1/0104;
(Continued)

(56) References Cited

U.S. PATENT DOCUMENTS 5,801,943 A * 9/1998 Nasburg ............... G08G 1/0104
340/910
9,633,560 B1 * 4/2017 Gao ..................... G08G 1/0145
(Continued)

FOREIGN PATENT DOCUMENTS

| EP | 2 320 403 A2 | 5/2011 |
| GB | 2 516 479 A | 1/2015 |

OTHER PUBLICATIONS

FHWA's Traffic Analysis Toolbox vol. VI: Dedfiniotions, etc., 11 pages, 2007 edition (was cited by the Applicant in its arguments of Jun. 22, 2017).*

(Continued)

*Primary Examiner* — Anne M Antonucci
*Assistant Examiner* — Sanjeev Malhotra
(74) *Attorney, Agent, or Firm* — Alston & Bird LLP

(57) ABSTRACT

A method is provided for traffic lane and traffic signal control identification and traffic flow management. Methods may identify traffic lights controlling lane movements, cataloging the information through analysis of traffic light signal phase and timing, and analyzing traffic movement through an intersection during specific periods of time. In particular, example methods may include identifying each of a plurality of paths through an intersection; identifying states of one or more traffic lights controlling traffic through the intersection; determining vehicle throughput data for the intersection through a predetermined number of cycles of the one or more traffic lights; and matching the vehicle throughput data to each of the plurality of paths of the intersection. The method may optionally include identifying times of movement and times of non-movement of vehicles across the intersection for each of the plurality of paths.

20 Claims, 5 Drawing Sheets

(52) U.S. Cl.
CPC ......... *G08G 1/0125* (2013.01); *G08G 1/0129* (2013.01); *G08G 1/0133* (2013.01); *G08G 1/08* (2013.01); *H04L 67/12* (2013.01)

(58) Field of Classification Search
CPC ........... G08G 1/0125; G08G 1/096783; G08G 1/096827; G08G 1/096861; G08G 1/052; G01C 21/32; G01C 21/3492; G01C 21/26; G01C 21/3658; H04W 4/046; B60W 2550/402; B60W 50/0097; G06F 17/30241
USPC ..... 701/2, 36, 117, 119, 408, 409, 411, 423, 701/533, 540; 705/14.49; 340/907; 246/130; 348/148; 52/30; 707/758
See application file for complete search history.

(56) References Cited

U.S. PATENT DOCUMENTS

| | | | |
|---|---|---|---|
| 9,805,595 B1* | 10/2017 | Liebinger Portela | G08G 1/0145 |
| 2002/0186147 A1* | 12/2002 | Basinger | G08G 1/081 340/910 |
| 2004/0130463 A1* | 7/2004 | Bloomquist | G08G 1/096716 340/907 |
| 2008/0094250 A1* | 4/2008 | Myr | G08G 1/04 340/909 |
| 2009/0040069 A1* | 2/2009 | Afzulpurkar | G06K 9/00785 340/934 |
| 2010/0134320 A1* | 6/2010 | Chevion | G08G 1/164 340/932 |
| 2010/0171640 A1* | 7/2010 | Delia | G08G 1/07 340/907 |
| 2011/0205086 A1* | 8/2011 | Lamprecht | G08G 1/08 340/928 |
| 2011/0258044 A1* | 10/2011 | Kargupta | G06Q 10/08 705/14.49 |
| 2012/0029730 A1* | 2/2012 | Nagura | F02N 11/0837 701/2 |
| 2012/0083996 A1 | 4/2012 | Tas et al. | |
| 2012/0146811 A1* | 6/2012 | Chou | G08G 1/096783 340/905 |
| 2013/0158794 A1* | 6/2013 | Wilson | G01C 21/32 701/36 |
| 2013/0275033 A1* | 10/2013 | Bastiaensen | G01C 21/26 701/119 |
| 2013/0282264 A1* | 10/2013 | Bastiaensen | G01C 21/3492 701/119 |
| 2013/0297211 A1* | 11/2013 | Burr | G01C 21/3492 701/540 |
| 2013/0341468 A1* | 12/2013 | Baldwin | B61L 29/22 246/130 |
| 2014/0097969 A1* | 4/2014 | Ni | G08G 1/07 340/907 |
| 2014/0163877 A1* | 6/2014 | Kiyama | G01C 21/3469 701/533 |
| 2014/0211012 A1* | 7/2014 | Nerayoff | H04N 7/181 348/148 |
| 2014/0352229 A1* | 12/2014 | Gustafson | E04H 14/00 52/30 |
| 2014/0372022 A1* | 12/2014 | Witmer | G01C 21/32 701/423 |
| 2015/0120175 A1* | 4/2015 | Vahidi | G08G 1/0141 701/119 |
| 2015/0134233 A1 | 5/2015 | Wolf | |
| 2015/0161886 A1* | 6/2015 | Kesting | G08G 1/012 701/117 |
| 2015/0198449 A1* | 7/2015 | Okude | G01C 21/3492 701/408 |
| 2015/0253141 A1* | 9/2015 | Kesting | G01C 21/32 701/409 |
| 2015/0300825 A1* | 10/2015 | Manoliu | G01C 21/32 701/36 |
| 2015/0310737 A1* | 10/2015 | Simanowski | G08G 1/081 340/910 |
| 2015/0310738 A1 | 10/2015 | Karacan et al. | |
| 2015/0356868 A1* | 12/2015 | Cuende Alonso | G01C 21/36 382/104 |
| 2016/0026659 A1* | 1/2016 | Harley | G06F 17/30289 707/758 |
| 2016/0042641 A1* | 2/2016 | Smith | G08G 1/0116 340/917 |
| 2016/0076896 A1* | 3/2016 | Konig | G01C 21/26 701/411 |
| 2016/0098924 A1* | 4/2016 | Vahidi | G08G 1/0141 701/119 |
| 2016/0379486 A1* | 12/2016 | Taylor | G08G 1/0141 340/905 |
| 2016/0379490 A1* | 12/2016 | Simanowski | G08G 1/081 340/910 |
| 2017/0069203 A1* | 3/2017 | Sharma | G08G 1/052 |
| 2017/0161410 A1* | 6/2017 | Mizuta | G06F 17/5009 |

OTHER PUBLICATIONS

International Search Report and Written Opinion for Interntional Application No. PCT/IB2016/057909 dated Mar. 24, 2017.

* cited by examiner

METHOD, APPARATUS AND COMPUTER PROGRAM PRODUCT FOR TRAFFIC LANE AND SIGNAL CONTROL IDENTIFICATION AND TRAFFIC FLOW MANAGEMENT

TECHNICAL FIELD

Example embodiments of the present invention relate generally to identifying traffic lanes and respective controlling signals, and more particularly, to identifying traffic lights controlling lane movements, cataloging the information through analysis of the traffic light signal phase and timing, and analyzing traffic movement through respective intersections during specific periods of time.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

The ubiquity of network communications has enabled municipalities to manage various aspects of infrastructure from remote locations while improving the utilization and reducing downtime of infrastructure components available for public use. For example, monitoring and recording consumption of utilities such as water, sewer, electricity, and gas provided to homes and businesses through a network of physical conduits has long been a manually intensive process involving meter-reading employees visually inspecting and recording the indicated consumption on meters at each physical location. The networking of wireless meters and the ability to read meters remotely has not only reduced the manual labor required, but also improved the accuracy of meter reading through the elimination of manual recording errors. Further, the infrastructure of roadways has also benefited from network communication capabilities by allowing municipalities to monitor traffic flow remotely at various locations throughout a network of roadways. These networks may also control or monitor traffic lights that meter flow of traffic through intersections, enabling traffic flows to be better monitored and controlled based on changing traffic patterns.

BRIEF SUMMARY

In general, example embodiments of the present invention provide an improved method of traffic lane and signal control identification and traffic flow management. According to an example embodiment, an apparatus may be provided including at least one processor and at least one memory including computer program code stored thereon. The at least one memory and the computer program code configured to, with the at least one processor, cause the apparatus to: identify each of a plurality of paths through an intersection; identify states of one or more traffic lights controlling traffic through the intersection; determine vehicle throughput data for the intersection through a predefined number of cycles of the one or more traffic lights; and match the vehicle throughput data to each of the plurality of paths of the intersection. The apparatus may optionally be configured to identify times of movement and times of non-movement of vehicles across the intersection for each of the plurality of paths.

According to some embodiments, causing the apparatus to match vehicle throughput to each of the plurality of paths of the intersection may include casing the apparatus to generate paths for each vehicle of the vehicle throughput of the intersection using vehicle probe data. Vehicle probe data may include timestamp information, vehicle speed and position information, and vehicle heading information. Causing the apparatus to generate paths for each vehicle of the vehicle throughput of the intersection may include causing the apparatus to retrieve vehicle probe data, sort vehicle data by time stamp, and match vehicle heading information to one or more of the plurality of paths through the intersection. The apparatus may be further configured to generate a model of the intersection including all available paths and each traffic light state that corresponds with permitting vehicle traffic along a respective path.

Embodiments of the present invention may provide a method including: identifying each of a plurality of paths through an intersection; identifying states of one or more traffic lights controlling traffic through the intersection; determining vehicle throughput data for the intersection through a predetermined number of cycles of the one or more traffic lights; and matching the vehicle throughput data to each of the plurality of paths of the intersection. The method may optionally include identifying times of movement and times of non-movement of vehicles across the intersection for each of the plurality of paths.

According to some embodiments, matching vehicle throughput to each of the plurality of paths of the intersection may include generating paths for each vehicle of the vehicle throughput of the intersection using vehicle probe data. The vehicle probe data may include timestamp information, vehicle speed and position information, and vehicle heading information. Generating paths for each vehicle of the throughput of the intersection may include: retrieving vehicle probe data; sorting vehicle data by timestamp; and matching vehicle heading information to one of the plurality of paths through the intersection. Vehicle probe data may further include longitude, latitude, and vehicle identification. The method of example embodiments may include generating a model of the intersection including all available paths and each traffic light state that corresponds with permitting vehicle traffic along a respective path.

Embodiments of the present invention may provide a computer program product including at least one non-transitory computer-readable storage medium having computer-executable program code instructions stored therein. The computer-executable program code instructions may include: program code instructions for identifying each of a plurality of paths through an intersection; program code instructions for identifying states of one or more traffic lights controlling traffic through the intersection; program code instructions for determining vehicle throughput data for the intersection through a predetermined number of cycles of the one or more traffic lights; and program code instructions for matching the vehicle throughput data to each of the plurality of paths of the intersection. Embodiments may optionally include program code instructions for identifying times of movement and times of non-movement of vehicles across the intersection for each of the plurality of paths.

According to some embodiments, the program code instructions for matching vehicle throughput to each of the plurality of paths of the intersection may include program code instructions for generating paths for each vehicle of the vehicle throughput of the intersection using vehicle probe data. The vehicle probe data may include timestamp information, vehicle speed and position information, and vehicle heading information. The program code instructions for generating paths for each vehicle of the vehicle throughput of the intersection may include: program code instructions for retrieving vehicle probe data; program code instructions for sorting vehicle data by timestamp; and program code instructions for matching vehicle heading information to one of the plurality of paths through the intersection. The computer program product of example embodiments may optionally include program code instructions for generating a model of the intersection including all available paths and each traffic light state that corresponds with permitting vehicle traffic along a respective path.

Embodiments of the present invention may provide an apparatus including means for: identifying each of a plurality of paths through an intersection; identifying states of one or more traffic lights controlling traffic through the intersection; determining vehicle throughput data for the intersection through a predetermined number of cycles of the one or more traffic lights; and matching the vehicle throughput data to each of the plurality of paths of the intersection. The apparatus may optionally include means for identifying times of movement and times of non-movement of vehicles across the intersection for each of the plurality of paths.

According to some embodiments, the means for matching vehicle throughput to each of the plurality of paths of the intersection may include means for generating paths for each vehicle of the vehicle throughput of the intersection using vehicle probe data. The vehicle probe data may include timestamp information, vehicle speed and position information, and vehicle heading information. The means for generating paths for each vehicle of the throughput of the intersection may include: means for retrieving vehicle probe data; means for sorting vehicle data by timestamp; and means for matching vehicle heading information to one of the plurality of paths through the intersection. Vehicle probe data may further include longitude, latitude, and vehicle identification. The apparatus of example embodiments may include means for generating a model of the intersection including all available paths and each traffic light state that corresponds with permitting vehicle traffic along a respective path.

BRIEF DESCRIPTION OF THE DRAWINGS

Figure 1:
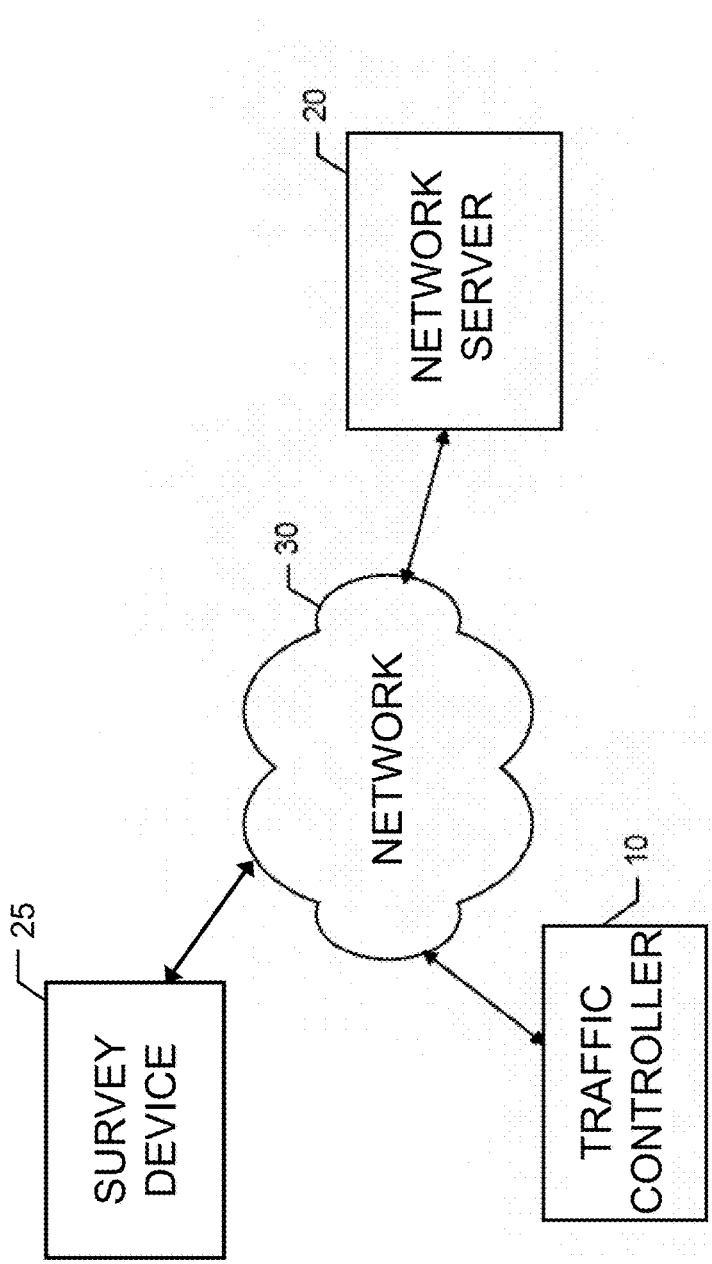
Figure 2:
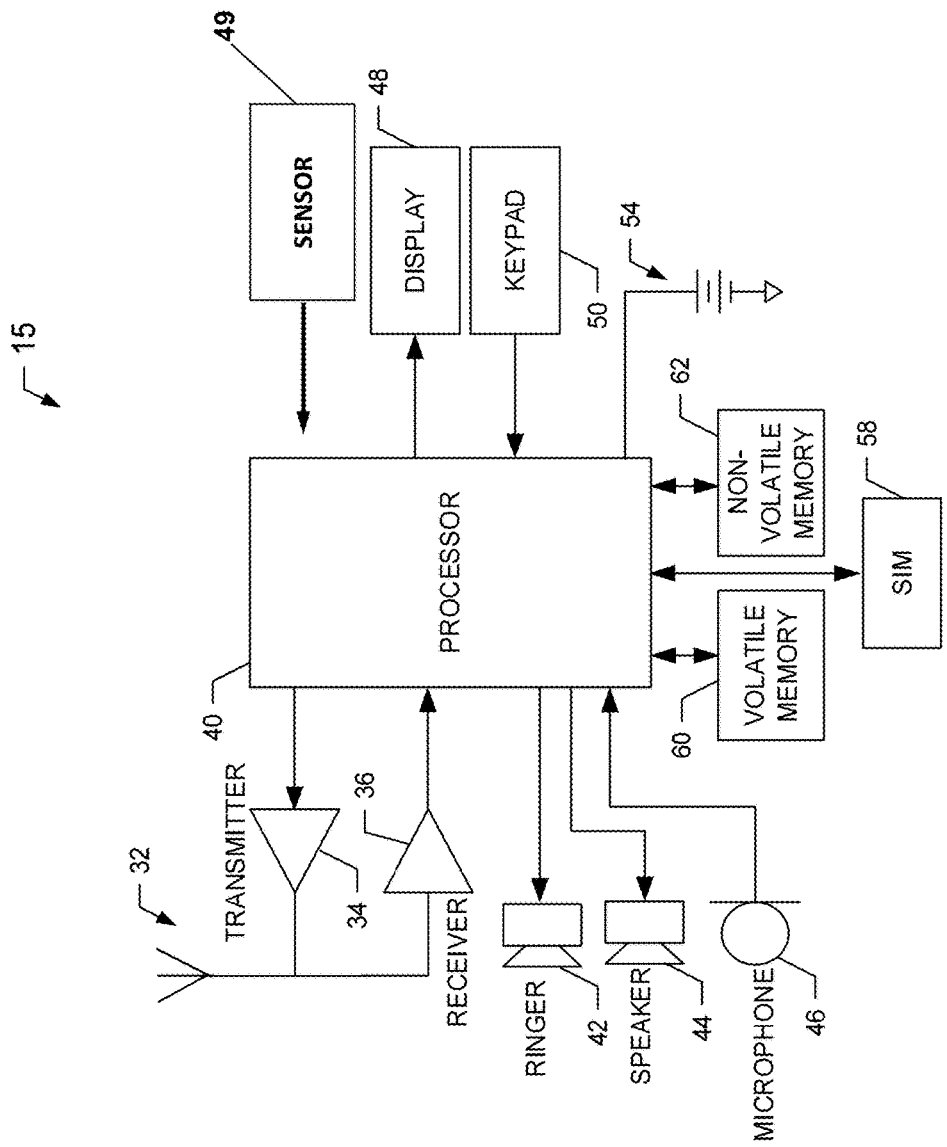
Figure 3:
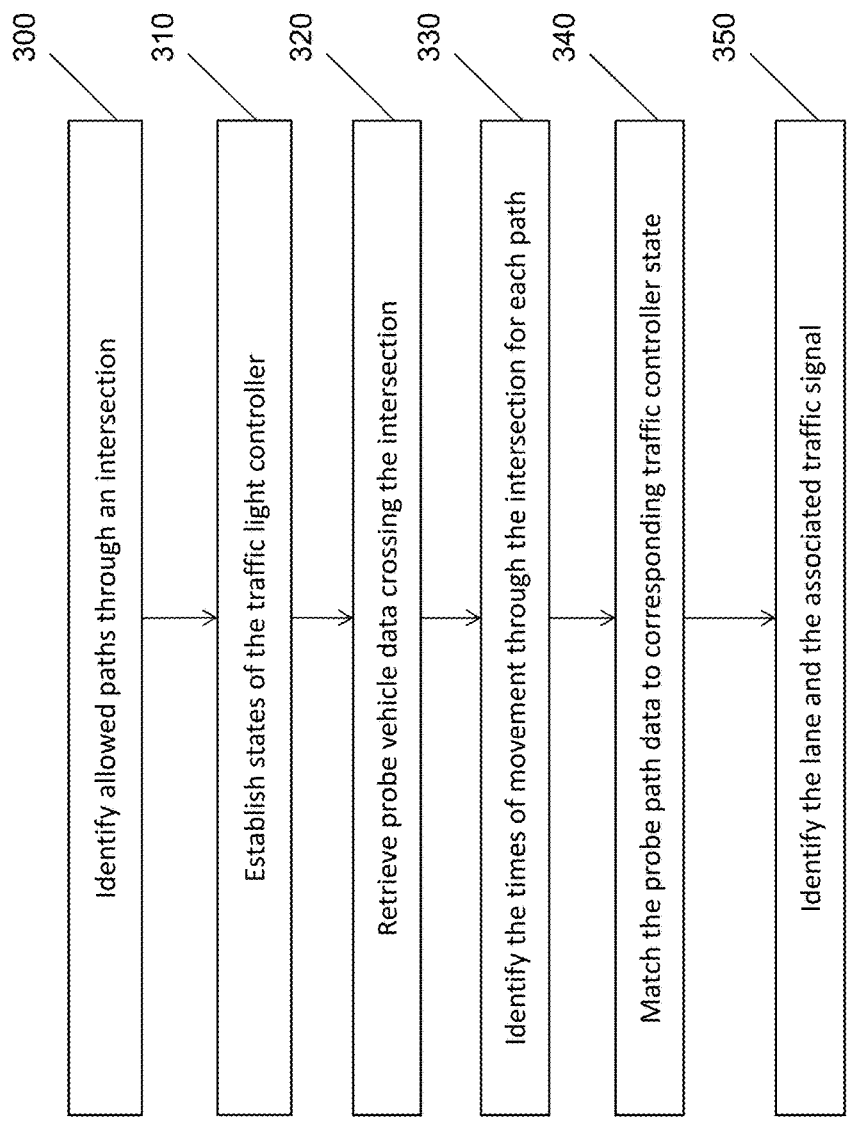
Figure 4:
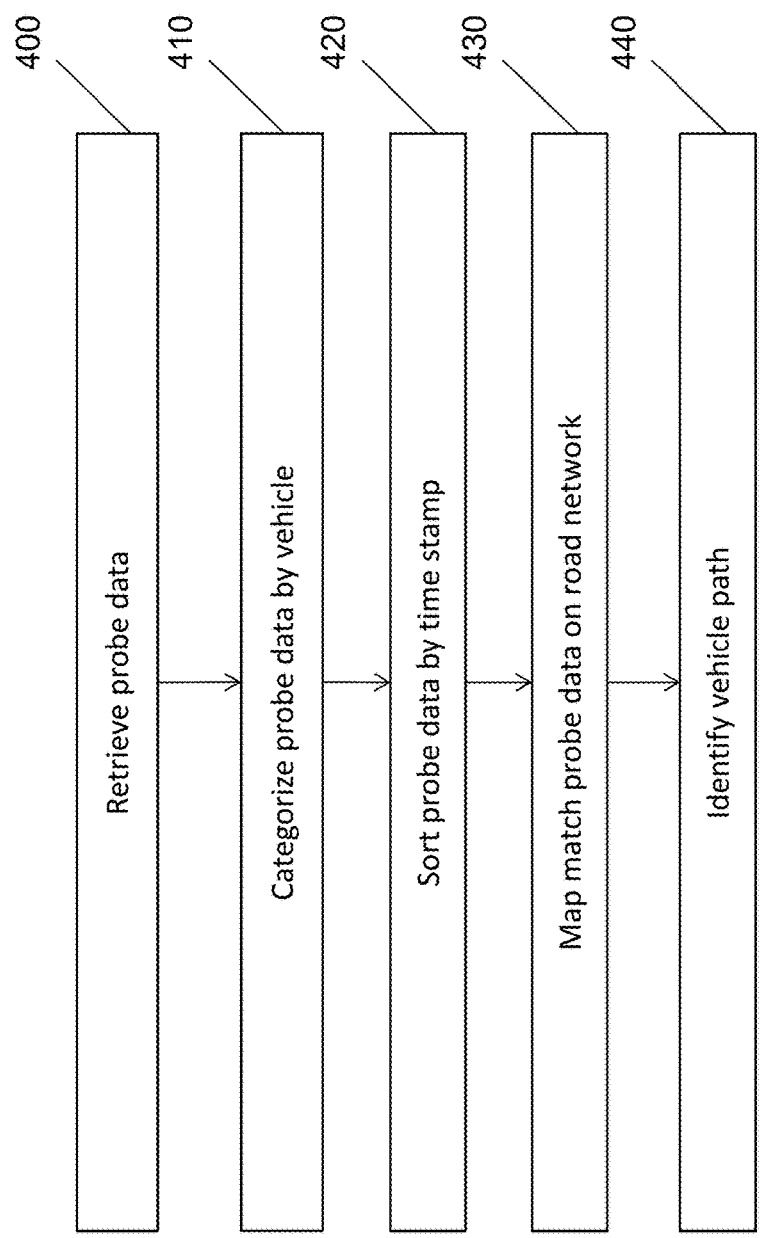
Figure 5:
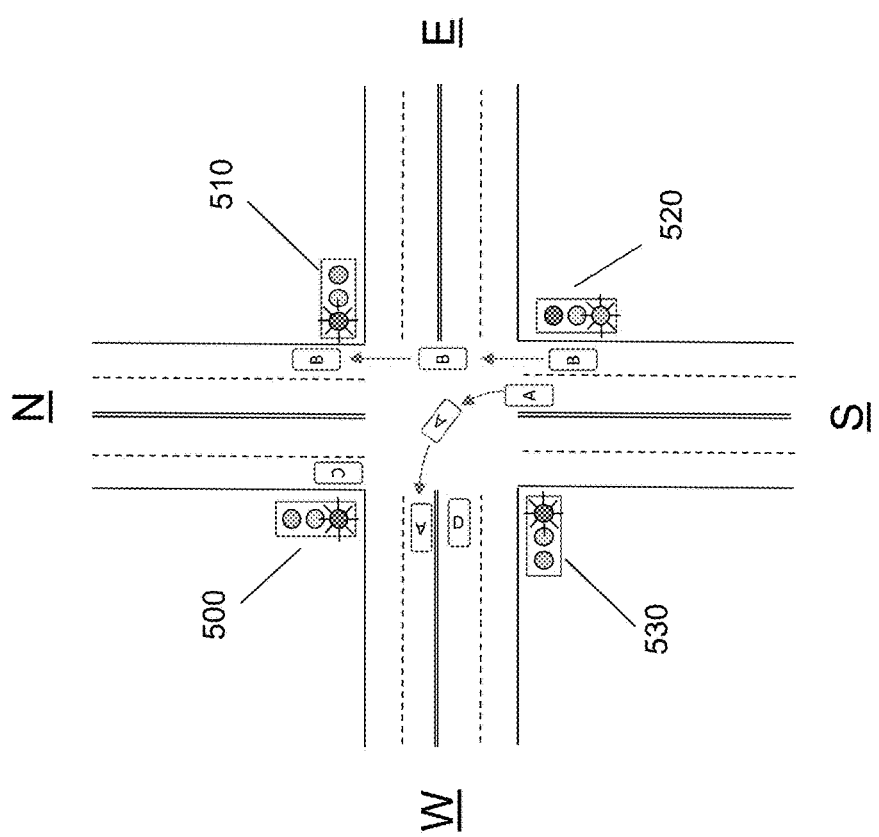

Having thus described example embodiments of the invention in general terms, reference will now be made to the accompanying drawings, which are not necessarily drawn to scale, and wherein:

FIG. 1 illustrates an communication system in accordance with an example embodiment of the present invention;

FIG. 2 is a schematic block diagram of a mobile device according to an example embodiment of the present invention;

FIG. 3 is a flowchart of a method for traffic lane and signal control identification and traffic flow management according to an example embodiment of the present invention;

FIG. 4 is a flowchart of a method for identifying available vehicle paths through an intersection according to an example embodiment of the present invention; and FIG. 5 is a schematic illustration of an intersection including traffic lights and vehicle paths available through the intersection in the illustrated traffic light state according to an example embodiment of the present invention.

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Example embodiments of the present invention may be used in conjunction with, or implemented by, a plurality of components of a system for identifying, controlling, cataloging, and maintaining one or more traffic signals or traffic lights controlling traffic flow at one or more intersections. According to some embodiments as illustrated in FIG. 1, a system may include a traffic controller 10 which controls the traffic signals at an intersection, such as through the traffic light signal phase and timing, together with sequences and patterns of traffic light function. The traffic controller 10 may be located proximate the intersection of the traffic light, or the traffic controller may be located remotely from the controlled traffic light and in communication with the traffic light through various types of wired or wireless communications, as further described below. The system may further include a network server 20 that is in communication with the traffic controller, such as via network 30, to provide information and commands to the traffic controller, and/or to receive information and data from the traffic controller, such as traffic volumes, hardware issues, or various other information that may be useful in the control of a traffic system.

Traffic control systems of various embodiments may further include a survey device 25 which may be implemented in some systems for the collection of information at an intersection with regard to a traffic controller 10 and convey information regarding the traffic lights surveyed to the network server 20. The survey device 25 may be implemented in scenarios in which the traffic controller 10 may not provide all of the information that may be used by the network server to establish traffic patterns and traffic light phases, such that the survey device 25 may supplement some traffic controllers, while other traffic controllers may provide all necessary information to the network server that is required for the traffic control system.

Communication may be supported by network 30 as shown in FIG. 1 that may include a collection of various different nodes, devices, or functions that may be in communication with each other via corresponding wired and/or wireless interfaces, or in ad-hoc networks such as those functioning over Bluetooth®. As such, FIG. 1 should be understood to be an example of a broad view of certain elements of a system that may incorporate example embodiments of the present invention and not an all inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols and/or the like.

One or more communication terminals, such as traffic controller 10 may be in communication with the network server 20 via the network 30, and each may include an antenna or antennas for transmitting signals to and for receiving signals from a base site, which could be, for example a base station that is part of one or more cellular or mobile networks or an access point that may be coupled to a data network; such as a local area network (LAN), a metropolitan area network (MAN), and/or a wide area network (WAN), such as the Internet. In turn, other devices (e.g., personal computers, server computers, or the like) may be coupled to the traffic controller 10, network server 20, or survey device 25, via the network 30. By directly or indirectly connecting the survey device 25, the traffic controller 10, the network server 20, and other devices to the network 30, the survey device 25 and traffic controller 10 may be enabled to communicate with the other devices or each other, for example, according to numerous communication protocols including Hypertext Transfer Protocol (HTTP) and/or the like, to thereby carry out various communication or other functions of the traffic controller 10 and/or the survey device 25.

According to some example embodiments, the survey device 25 may be embodied by a mobile terminal which may be a mobile or fixed communication device, and the traffic controller 10 may be embodied by a fixed communication device. Thus, for example, the survey device 25 and traffic controller could be, or be substituted by, any of personal computers (PCs), personal digital assistants (PDAs), wireless telephones, desktop computers, laptop computers, mobile computers, cloud based computing systems, or various other devices or combinations thereof.

Although the survey device 25 may be configured in various manners, one example of a survey device 25 embodied by a mobile terminal that could benefit from embodiments of the invention is depicted in the block diagram of FIG. 2. While several embodiments of the survey device 25 may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communication devices, may employ embodiments of the survey device 25 of the present invention. Further, while the traffic controller 10 is generally described as a fixed computing device, example embodiments may include a mobile terminal as illustrated in FIG. 2, or implement one or more features of the mobile terminal, such as the components to facilitate data collection and processing, and the components to facilitate communications, as will be appreciated by one of skill in the art.

The survey device 25 or traffic controller 10 may, in some embodiments, be a computing device configured to employ an example embodiment of the present invention. However, in some embodiments, the device or controller, referred to collectively as a computing device, may be embodied as a chip or chipset. In other words, the computing device may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computing device may therefore, in some cases, be configured to implement an embodiment of the present invention on a single chip or as a single "system on a chip." As such, in some cases, a chip or chipset may constitute means for performing one or more operations for providing the functionalities described herein.

FIG. 2 illustrates a computing device 15 which may embody the survey device 25, the traffic controller 10, or the network server 20. The survey device 25, traffic controller 10, and network server may omit certain features, or include additional features not illustrated as required to perform the various operations described below with respect to their functions. The illustrated computing device 15 may include an antenna 32 (or multiple antennas) in operable communication with a transmitter 34 and a receiver 36. The computing device may further include a processor 40 that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile terminal may be capable of operating with one or more air interface standards, communication protocols, modulation types, and access types. By way of illustration, the computing device 15 may be capable of operating in accordance with any of a number of first, second, third and/or fourth-generation communication protocols or the like. For example, the computing device 15 may be capable of operating in accordance with second-generation (2G) wireless communication protocols IS-136, GSM and IS-95, or with third-generation (3G) wireless communication protocols, such as UMTS, CDMA2000, wideband CDMA (WCDMA) and time division-synchronous CDMA (TD-SCDMA), with 3.9G wireless communication protocols such as E-UTRAN (evolved-UMTS terrestrial radio access network), with fourth-generation (4G) wireless communication protocols or the like.

The processor may be embodied in a number of different ways. For example, the processor may be embodied as various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like), a hardware accelerator, and/or the like.

In an example embodiment, the processor 40 may be configured to execute instructions stored in the memory device 60 or otherwise accessible to the processor 40. Alternatively or additionally, the processor 40 may be configured to execute hard coded functionality. As such, whether configured by hardware or software methods, or by a combination thereof, the processor 40 may represent an entity (e.g., physically embodied in circuitry) capable of performing operations according to an embodiment of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40 to perform the algorithms and/or operations described herein when the instructions are executed. However, in some cases, the processor 40 may be a processor of a specific device (e.g., a mobile terminal or network device) adapted for employing an embodiment of the present invention by further configuration of the processor 40 by instructions for performing the algorithms and/or operations described herein. The processor 40 may include, among other things, a clock, an arithmetic logic unit (ALU) and logic gates configured to support operation of the processor 40.

The computing device 15 may also comprise a user interface including an output device such as an earphone or speaker 44, a ringer 42, a microphone 46, a display 48, and a user input interface, which may be coupled to the processor 40. The user input interface, which allows the computing device 15 to receive data, may include any of a number of devices allowing the computing device to receive data, such as a keypad 50, a touch sensitive display (not shown) or other input device. In embodiments including the keypad, the keypad may include numeric (0-9) and related keys (#, *), and other hard and soft keys used for operating the computing device 15. Alternatively, the keypad may include a conventional QWERTY keypad arrangement. The keypad may also include various soft keys with associated functions. In addition, or alternatively, the computing device may include an interface device such as a joystick or other user input interface. The computing device may further include a battery 54, such as a vibrating battery pack, for powering various circuits that are used to operate the computing device, as well as optionally providing mechanical vibration as a detectable output. The computing device 15 may also include a sensor 49, such as an accelerometer, motion sensor/detector, temperature sensor, or other environmental sensor to provide input to the processor indicative of a condition or stimulus of the computing device 15. According to some embodiments, the computing device 15 may include an image sensor as sensor 49, such as a camera configured to capture still and/or moving images.

The computing device 15 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber or to a service technician who is assigned the survey device 25, for example. In addition to the UIM, the mobile terminal may be equipped with memory. For example, the computing device 15 may include volatile memory 60, such as volatile Random Access Memory (RAM) including a cache area for the temporary storage of data. The computing device may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the computing device to implement the functions of the computing device. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the processor 40, which determines an identity of the current cell, i.e., cell id identity or cell id information, with which the mobile terminal is in communication.

In general, example embodiments of the present invention may provide a method for determining and cataloging an identification of a traffic light controlling a lane or road's movement through an automated process via analysis of the signal phase and the timing information of the traffic light, and a comparison to vehicle movement through an intersection controlled by the traffic light over one or more periods of time.

Traffic signals, referred to herein generally as traffic lights, and traffic signal or traffic light controllers, referred to generally herein as traffic controllers, are becoming connected devices, as traffic controllers are more frequently networked with one another on a traffic control system that may be managed by a central traffic control operation. Managing traffic lights from a central operation may enable better control over traffic flow through an area, such as an urban or suburban region by having the traffic lights work in cooperation with one another. This cooperative operation may increase traffic throughput while reducing fuel consumption and reducing driver irritation. Further, increased traffic throughput may reduce the perceived need for higher-capacity roadways (e.g., through additional lanes or bypass roads) and may lead to cost savings through optimization of existing roadways.

The status of the signal phase and the timing of the state transitions of a traffic light may be collected in real-time (e.g., through traffic controller 10 or survey device 25), or predicted through engineering analysis. The signal phase may include the signal that is presented to a motorist, pedestrian, cyclist, etc., at an intersection. Traffic lights may include various phases. For example, a single-phase traffic light may include a flashing amber or red light indicating right-of-way at an intersection, or a green or red arrow to indicate a protected or prohibited turn. A dual-phase traffic light may include, for example, a pedestrian walk/don't walk signal. A three-phase traffic light may include a conventional green/amber/red traffic light. Embodiments described herein may pertain to all traffic light phases and is not limited to the brief description of phases above. The state transitions may include transitions between phases at a traffic light. A traffic light changing from green to amber is a first state transition, while changing from amber to red is a second state transition. The collected signal phase and timing of the state transitions may be provided through communication protocols either directly to interested users, or through a distribution network shown in FIG. 1.

A traffic light stage may include all traffic lights operating at an intersection, and may consist of a series of non-conflicting phases that run together. A stage may begin with any phase, and may end when that phase begins again. This stage may be depicted by a stage diagram using arrows to depict the movements of vehicles through each traffic light phase of the stage. The time to complete an entire traffic light stage is considered the "cycle time," which may be varied by a traffic controller depending on traffic patterns, as will be described further below.

According to embodiments described herein, traffic lights and traffic light controllers may be assigned specific identification information to indicate the intersection related to the traffic lights. However, traffic controllers often do not identify, nor are they cataloged to include information regarding specific lanes in the road network that are controlled by the traffic light associated with the traffic controllers. In such situations, traffic monitoring municipalities or traffic control companies may have to physically go to an intersection to map the relationship between the controlling traffic lights and the specific lanes that are being controlled. Further, adding signal phase and timing information from these intersections through manual collection can be tedious. This manual process can be time consuming, costly, and prone to error.

As noted above, embodiments described herein may identify and catalog traffic lights controlling a lane or road's movement through an automated process through analysis of the traffic light signal phase and timing information as compared to vehicle movement through the intersection at one or more periods of time. Traffic light signal phase and timing information may be obtained through the distribution sources for an intersection or a set of intersections.

The overall state of the logic controlling an intersection and the traffic light stage may require providing a period of time when vehicles are approaching the intersection from a specific direction or a specific set of directions, that are allowed to proceed through the intersection, while over the same period of time, vehicles approaching from conflicting directions or desiring to cross the path or paths of the initial approaching vehicles are prevented from entering the intersection.

Vehicle movement through an intersection may be captured in a variety of manners. For example, vehicle movement can be obtained through data collected from the vehicles as they approach, enter, and depart the intersection. This data may be collected from antenna or sensors arranged to detect an identification tag, such as a radio frequency identification tag (RFID) associated with the vehicle, or other form of identifier associated with each vehicle. The identifier may be unique to the vehicle, such as a unique vehicle identification number (VIN), or the information may be more anonymous, such as a generic identifier of a vehicle serving only to illustrate the presence of "a" vehicle. Various levels of detail there between may also be obtained, in dependence of how vehicles are equipped. For example, vehicles may include an identification tag that may be read through a near-field communication (NFC) reader identifying the type of vehicle (e.g., sedan, pickup truck, SUV, etc.), identifying the make/model of vehicle, identifying the vehicle by a weight class or size class, or the like. Any type of vehicular identification may be used in embodiments described herein. While generic vehicle identifiers may provide basic functionality of example embodiments, more detailed vehicle identifiers may be used to monitor the type of traffic through an intersection (e.g., commercial truck traffic, passenger car traffic, etc.). According to the example embodiments described below, vehicles may be equipped with a vehicle probe configured to communicate with the traffic controller 10 and/or survey device 25. The vehicle may also be equipped to send probe data via a connected service to a traffic monitoring system or may store the probe information locally for later retrieval. Further, the identification of a vehicle can be anonymized with the recipient of the vehicle probe data knowing only the identification of "a" vehicle as it passes through an intersection while it is in the intersection. For example, upon entering an intersection, a vehicle may be attributed a random identifier specifying the probe data from that unique vehicle. The probe data from that vehicle may be associated with the random identifier throughout the duration of time spent in the intersection. Once the vehicle leaves the intersection, the vehicle identity may be forgotten, while the probe data associated with the path of that vehicle remains.

FIGS. 3 and 4 are flowcharts illustrative of a system, method, and program product according to example embodiments of the invention. The flowchart operations may be performed by a computing device, such as computing device 15 of FIG. 2, as operating over a communications network, such as that shown in FIG. 1. It will be understood that each block of the flowcharts and combinations of blocks in the flowcharts may be implemented by various means, such as hardware, firmware, processor, circuitry, and/or other device associated with execution of software including one or more computer program instructions. For example, one or more procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware), such as depicted in FIG. 2, to produce a machine, such that the resulting computer or other programmable apparatus embody means for implementing the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

An example embodiment of the process for obtaining the overall state of the logic for an intersection is provided in the flowchart of FIG. 3. According to the depicted method, the allowed paths through an intersection are identified and enumerated at 300. This may be performed through the retrieval of a map artifact for the intersection. The times that each path is allowed through the intersection may also be identified. The states of the traffic light intersection controller may be established at 310. Each state may include a set of non-conflicting phases of each traffic light of the intersection that are presented at the same time. At 320, the detected probes at the intersection may be extracted for a plurality of cycles of each state. For example, the probe data from traffic flowing through the intersection at a first stage may be collected for 5 to 10 cycles of that first stage. Paths may be created or identified from the probe data indicative of the route of each probe through the intersection. For example, in a conventional 4-way intersection, the paths of a north-bound vehicle may include: straight, continuing northbound through the intersection in a specific northbound lane; right turn from the right-most northbound lane to the right-most eastbound lane; left turn form the left-most northbound lane to the left-most westbound lane, etc. Further paths may be established for unconventional routes, such as lane-changes in the intersection, turns not made from the appropriate lane, etc. The times of movement across or through the intersection may be identified for each path at 330. The times of non-movement may also be identified. The paths established based on the probe data may be matched to the enumerated states of the traffic light controller at 340. The enumerated paths identified through the intersection of 300 may be aligned to the traffic controller states of 310 using the times of movement identified in 330. This may be used to identify the lane of the intersection that is associated with each traffic light of the intersection, as shown at 350.

According to some embodiments described herein, probe data may further comprise lane information. The lane information may be gathered by, for example, information derived from images captured by a camera, such as by sensor 49 of computing device 15 when configured as an image sensor. The lane information may be incorporated into the probe data to provide additional granularity in the probe data when compiled to generate accurate models of intersections.

Through the analysis described above with respect to the flowchart of FIG. 3, detailed information regarding the traffic flow through the intersection may be obtained together with detailed information regarding the paths of vehicles associated with the various states of the traffic lights of the intersection. The method of FIG. 3 may be performed, for example, at traffic controller 10, on survey device 25, or through a combination thereof, or optionally, the traffic controller 10 or survey device 25 may provide data to the network server 20 such that data gathering may be conducted at the intersection, while data processing may be conducted on the network server.

The flowchart of FIG. 4 illustrates an example method of vehicle probe data collection for constructing the paths used in operation 320 of FIG. 3 described above. Probe data may be retrieved at 400, such as through collection of probe data by a survey device 25, from a memory (e.g., memory 62) of a traffic controller 10, and optionally the vehicle probe data may be periodically reported by a mobile device associated with a respective vehicle to a server for processing, such as a remotely located traffic controller 10. The operations of FIG. 4, as described above, can be performed by the traffic controller 10 and/or the survey device 25, and possibly in conjunction with the network server 20. The vehicle probe data may be categorized by vehicle as shown at 410. For example, each vehicle may provide at least two probe data points from traveling through an intersection: entering and exiting the intersection. Probe data can be generated by a mobile device associated with the vehicle and stored locally and reported periodically, where the probe data may be compiled with other probe data and analyzed according to embodiments described herein. Optionally, probe data can be generated by a mobile device associated with the vehicle and communicated through near-field communication beacons proximate the roadway, such as at the intersection.

Once the probe data is collected, the categorization of the vehicle may identify the probe detections from each vehicle individually. The probe data may be sorted for each vehicle by timestamp, to properly determine, for example, an intersection entry versus an intersection exit, or multiple intersection entrances and exits, at 420. The collected probe data may be matched to data on a road network, identifying the lanes that the vehicle was in while entering the intersection, exiting the intersection, and potentially intermediate points in the intersection at 430. The path of the vehicle can then be discerned at 440 to plot a path of the vehicle through the intersection. This vehicle path is then used at 330 and 340 of FIG. 3 to identify and catalog the traffic lights and their relation to each lane of the intersection with regard to traffic flow, as described above.

In an example embodiment, an apparatus for performing the method of FIGS. 3 and 4 above may comprise a processor (e.g., the processor 40) configured to perform some or each of the operations (300-350 and/or 400-440) described above. The processor may, for example, be configured to perform the operations (300-350 and/or 400-440) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 300-350 and/or 400-440 may comprise, for example, the processor 40 and/or a device or circuit for executing instructions or executing an algorithm for processing information as described above.

FIG. 5 depicts an example embodiment of an intersection of two four-lane roads. As shown, four traffic lights 500-530 control the intersection traffic flow. The traffic light 500, governing traffic flowing southbound is red, as is traffic light 510 governing traffic flowing westbound. Traffic flowing eastbound is governed by traffic light 530, which is also red. Traffic light 520, governing traffic flowing northbound is green. As shown, vehicle A begins in the left-most lane of the northbound lanes, while vehicle B is in the right-most lane of the northbound lanes. Vehicle A turns to the left-westbound lane, while vehicle B continues straight through the intersection, remaining in the right-most northbound lane. Vehicle C is stopped in the right-most southbound lane, while vehicle D is stopped in the left-most eastbound lane. Through the analysis described in the flowchart of FIG. 3, using the data collection of the method of FIG. 4, the traffic light state of 500, 510, 530 as red, and 520 as green, enables traffic to flow from northbound lanes straight and turning westbound. This information is recorded, stored, and cataloged as traffic flow examples in the traffic light state illustrated. Other traffic paths may also be permitted through the traffic light state of FIG. 5, such as straight through the intersection in the left-most lane of the northbound lanes, and turning east from the right-most lane of the northbound lanes to the right-most or left-most lane of the eastbound lanes. These paths would be identified, stored, and cataloged as more samples were taken of the intersection and at different time periods.

As shown, through monitoring of vehicle paths through intersections based on traffic light states, a complete model of the intersection can be built and modeled to optimize traffic flow. Information from all intersections under the control of a traffic control entity (e.g., municipality or commercial entity) can be compiled to create a traffic flow model that may optimize traffic flow through an urban or suburban environment based on a time of day, event, or other traffic-influencing factor, in order to maximize throughput on existing roadways, minimize fuel consumption, and minimize driver frustration.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the at least one processor, cause the apparatus to at least perform:
   identify each of a plurality of paths through an intersection;
   identify states of one or more traffic lights controlling traffic through the intersection;
   determine vehicle throughput data for the intersection through a predetermined number of cycles of the one or more traffic lights;
   match the vehicle throughput data to each of the plurality of paths of the intersection;
   correlate, by the processor, each path through the intersection with one or more of the one or more traffic lights based on the vehicle throughput data and the states of the one or more traffic lights;
   store the correlated paths through the intersection and the associated one or more of the one or more traffic lights including a respective state;
   catalog the correlated paths through the intersections and the associated one or more traffic lights including a respective associated state as traffic flow examples;
   generate a model of the intersection based on the cataloged correlated paths through the intersection;
   generate a traffic flow model for the intersection using the correlated paths and associated traffic lights; and
   implement a traffic light control strategy derived from the traffic flow model for the intersection to increase the vehicle throughput of the intersection.

2. The apparatus of claim 1, wherein the apparatus is further configured to:
   identify times of movement and times of non-movement of vehicles across the intersection for each of the plurality of paths.

3. The apparatus of claim 1, wherein causing the apparatus to match vehicle throughput data to each of the plurality of paths of the intersection comprises causing the apparatus to generate paths for each vehicle of the vehicle throughput of the intersection using vehicle probe data.

4. The apparatus of claim 3, wherein vehicle probe data comprises two or more of:
   timestamp information;
   vehicle speed information;
   vehicle position information; or
   vehicle heading information.

5. The apparatus of claim 4, wherein the vehicle probe data comprises the vehicle heading information and wherein causing the apparatus to generate paths for each vehicle of the vehicle throughput of the intersection comprises causing the apparatus to:
   retrieve vehicle probe data;
   sort vehicle data by timestamp; and
   match the vehicle heading information to one of the plurality of paths through the intersection.

6. The apparatus of claim 5, wherein the vehicle probe data further comprises two or more of:
   longitude;
   latitude;
   altitude; or
   vehicle identification.

7. The apparatus of claim 3, wherein the apparatus is further configured to generate a model of the intersection including all available paths and each traffic light state that corresponds with permitting vehicle traffic along a respective path.

8. A method comprising:
   identifying each of a plurality of paths through an intersection;
   identifying states of one or more traffic lights controlling traffic through the intersection;
   determining vehicle throughput data for the intersection through a predetermined number of cycles of the one or more traffic lights;
   matching the vehicle throughput data to each of the plurality of paths of the intersection;
   correlating, by a processor, each path through the intersection with one or more of the one or more traffic lights based on the vehicle throughput data and the states of the one or more traffic lights;
   storing the correlated paths through the intersection and the associated one or more of the one or more traffic lights including a respective state in a memory;
   cataloging the correlated paths through the intersections and the associated one or more traffic lights including a respective associated state as traffic flow examples;
   generating a model of the intersection based on the cataloged correlated paths through the intersection;
   generating a traffic flow model for the intersection using the correlated paths and associated traffic lights; and
   implementing a traffic light control strategy derived from the traffic flow model for the intersection to increase the vehicle throughput of the intersection.

9. The method of claim 8, further comprising: identifying times of movement and times of non-movement of vehicles across the intersection for each of the plurality of paths.

10. The method of claim 8, wherein matching vehicle throughput to each of the plurality of paths of the intersection comprises generating paths for each vehicle of the vehicle throughput of the intersection using vehicle probe data.

11. The method of claim 10, wherein vehicle probe data comprises two or more of:
   timestamp information;
   vehicle speed information;
   vehicle position information; or
   vehicle heading information.

12. The method of claim 11, wherein the vehicle probe data comprises the vehicle heading information and wherein generating paths for each vehicle of the vehicle throughput of the intersection comprises:
   retrieving vehicle probe data;
   sorting vehicle data by timestamp; and
   matching the vehicle heading information to one of the plurality of paths through the intersection.

13. The method of claim 12, wherein the vehicle probe data further comprises two or more of:
   longitude;
   latitude;
   altitude; or
   vehicle identification.

14. The method of claim 10, further comprising generating a model of the intersection including all available paths and each traffic light state that corresponds with permitting vehicle traffic along a respective path.

15. A computer program product comprising at least one non-transitory computer-readable storage medium having computer-executable program code instructions stored therein, the computer-executable program code instructions comprising:
   program code instructions for identifying each of a plurality of paths through an intersection;
   program code instructions for identifying states of one or more traffic lights controlling traffic through the intersection;
   program code instructions for determining vehicle throughput data for the intersection through a predetermined number of cycles of the one or more traffic lights;
   program code instructions for matching the vehicle throughput data to each of the plurality of paths of the intersection;
   program code instructions for correlating each path through the intersection with one or more of the one or more traffic lights based on the vehicle throughput data and the states of the one or more traffic lights;
   program code instructions for storing the correlated paths through the intersection and the associated one or more of the one or more traffic lights including a respective state;
   program code instructions for cataloging the correlated paths through the intersections and the associated one or more traffic lights including a respective associated state as traffic flow examples;
   program code instructions for generating a model of the intersection based on the cataloged correlated paths through the intersection;
   program code instructions for generating a traffic flow model for the intersection using the correlated paths and associated traffic lights; and
   program code instructions for implementing a traffic light control strategy derived from the traffic flow model for the intersection to increase the vehicle throughput of the intersection.

16. The computer program product of claim 15, further comprising: program code instructions for identifying times of movement and times of non-movement of vehicles across the intersection for each of the plurality of paths.

17. The computer program product of claim 15, wherein the program code instructions for matching vehicle throughput to each of the plurality of paths of the intersection comprises program code instructions for generating paths for each vehicle of the vehicle throughput of the intersection using vehicle probe data.

18. The computer program product of claim 17, wherein vehicle probe data comprises two or more of:
   timestamp information;
   vehicle speed information;
   position information; or
   vehicle heading information.

19. The computer program product of claim 18, wherein the vehicle probe data comprises the vehicle heading information and wherein the program code instructions for generating paths for each vehicle of the vehicle throughput of the intersection comprises:
   program code instructions for retrieving vehicle probe data;
   program code instructions for sorting vehicle data by timestamp; and
   program code instructions for matching the vehicle heading information to one of the plurality of paths through the intersection.

20. The computer program product of claim 17, further comprising program code instructions for generating a model of the intersection including all available paths and each traffic light state that corresponds with permitting vehicle traffic along a respective path.

* * * * *